United States Patent [19]

Schiavone

[11] Patent Number: 5,619,685
[45] Date of Patent: Apr. 8, 1997

[54] RUN-TIME DYNAMICALLY ADAPTIVE COMPUTER PROCESS FOR FACILITATING COMMUNICATION BETWEEN COMPUTER PROGRAMS

[75] Inventor: Daniel P. Schiavone, Beavercreek, Ohio

[73] Assignee: Ball Corporation, Muncie, Ind.

[21] Appl. No.: 334,596

[22] Filed: Nov. 4, 1994

[51] Int. Cl.$^6$ .............................. G06F 17/30; G06F 13/00
[52] U.S. Cl. ......................... 395/500; 395/610; 395/670; 395/701
[58] Field of Search ...................................... 395/500, 650, 395/600, 155, 161, 800, 700, 200.05, 200.12; 364/146, 132, 134, 239, 927.92, 927.95, 927.99

[56] References Cited

U.S. PATENT DOCUMENTS

| | | | |
|---|---|---|---|
| 3,728,692 | 4/1973 | Fennel, Jr. | 340/172.5 |
| 4,302,820 | 11/1981 | Struger et al. | 364/900 |
| 4,791,558 | 12/1988 | Chaitin et al. | 364/200 |
| 4,891,785 | 1/1990 | Donohoo | 364/200.01 |
| 4,896,289 | 1/1990 | Svinicki et al. | 395/183.1 |
| 4,964,042 | 10/1990 | Sterling et al. | 364/200 |
| 4,992,940 | 2/1991 | Dworkin | 364/401 |
| 5,051,745 | 9/1991 | Katz | 341/51 |
| 5,051,898 | 9/1991 | Wright et al. | 364/200 |
| 5,058,000 | 10/1991 | Cox et al. | 395/600 |
| 5,097,533 | 3/1992 | Burger et al. | 395/500 |
| 5,115,500 | 5/1992 | Larsen | 395/425 |
| 5,119,465 | 6/1992 | Jack et al. | 395/500 |
| 5,165,015 | 11/1992 | Coggins | 395/155 |
| 5,165,022 | 11/1992 | Erhard et al. | 395/275 |
| 5,167,009 | 11/1992 | Skeirik | 395/27 |
| 5,179,700 | 1/1993 | Aihara et al. | 395/650 |
| 5,179,703 | 1/1993 | Evans | 395/700 |
| 5,218,547 | 6/1993 | Tebbs | 364/424.06 |
| 5,228,137 | 7/1993 | Kleinerman et al. | 395/500 |
| 5,230,049 | 7/1993 | Chang et al. | 395/700 |
| 5,239,662 | 8/1993 | Danielson et al. | 395/800 |
| 5,247,616 | 9/1993 | Berggren | 395/200.08 |
| 5,251,314 | 10/1993 | Williams | 395/600 |
| 5,430,863 | 7/1995 | Kmiec | 395/500 |
| 5,471,611 | 11/1995 | McGregor | 395/600 |
| 5,504,902 | 4/1996 | McGrath et al. | 395/700 |

Primary Examiner—Kevin J. Teska
Assistant Examiner—Tan Nguyen
Attorney, Agent, or Firm—Gilbert E. Alberding

[57] ABSTRACT

The present invention provides a dynamic interface between two dissimilar software programs that must communicate with each, whether running on one or a plurality of computers. The invention can provide bi-directional, non-intrusive data manipulation and communications between software programs on a distributed computing platform or across platforms on a distributed network. The invention includes user-defined template files, a user-defined equality file, first and second blocks of shared memory, a master interface, and a slave interface. The template files define the output and input data of their respective programs and map the output and input data to blocks of memory. The equality file equates the input data and output data of one program with the output data and input data, respectively, of the other computer program. The master interface takes data from the master side block of memory, reconfigures the data based on the contents of the equality file to match the input data requirements of the second computer program, and sends the reconfigured data to the slave interface to be loaded into the slave side block of shared memory. The second computer program accesses the reconfigured data from the slave side of shared memory.

33 Claims, 13 Drawing Sheets

```
FILE:              SIMULATION MODEL {First Program}
SECTION:           INPUT
semkey = 7014;     {Start location for input shared
                    memory}
Percent_loading:   float;
terminate : int;
SECTION:           OUTPUT
semkey = 2314;     {Start location for output shared
                    memory}
t : float;
nnplyr : int;
record state       {This record holds player information}
begin
      x : float;
      y : float;
      z : float;
      xdot : float;
      ydot : float;
      zdot : float;
      xddot : float;
      yddot : float;
      zddot : float;
      roll : float;
      pitch : float;
      yaw : float;
      rolldot : float;
      pitchdot : float;
      yawdot : float;
      tlu : float;
end
record unit        {This is an initialization record}
begin
      rectype : int;
      numflds : int;
      playid : int;
      iconid : int;
      label : char[20];
end
```

Fig. 6a numplyr : int; {This tells the number of players.}
numrec5s : int;
terminate : int;

SECTION:         CONFIGURATION host sauron;

path ui/ui_working;

shmkey = 2314;

memory t [1];
memory nnplyr[200];
memory numplyr[1];
memory numrec5s[1];
memory state[200];
memory init[200];
memory terminate[1];
memory OUT_INTERFACE; memory Percent_loaded[1];
memory Percent_loaded[1];

control for nnplyr is numplyr;
control for state is numplyr;
control for init is numrec5s;

eof

Fig. 6b

FILE: VISUALIZATION TOOL {Second Program}
SECTION: INPUT
semkey = 1114; {Start location for input shared memory}
record record1 {This record holds player information}
begin rectype : int;
    numflds : int;
    time : float;
    x : float;
    y : float;
    z : float;
    h : float;
    p : float;
    r : float;
    playid : int;

end
record record5 {This is an initialization record}
begin rectype : int;
    numflds : int;
    playid : int;
    iconid : int;
    label : char[20];

end
record r1info
begin numrecs : int;

end
record r5info
begin numrecs : int;

end

Fig. 7a

```
terminate : int;

SECTION:            OUTPUT
semkey = 2323;   {Start location for output shared memory}
Percent_loading: float: {Processor Loading}
terminate: int;

SECTION:            CONFIGURATION
host gandalf;
path ui/ui_working;
shmkey = 3333;
memory r1info[1];
memory r5info [1];
memory record1[200];
memory record5[200];
memory terminate[1];
memory IN_INTERFACE;
memory percent_loading[1];

control for record1 is r1info;
control for record5 is r5info;

eof
```

Fig. 7b equality

FILE:                 VISUALIZATION TOOL TO SIMULATION MODEL
                         {Second Program to First Program}

```
record1.rectype = init.rectype;
record1.numflds = init.numflds;
record1.time = t;
record1.x = state.x;
record1.y = state.y;
record1.z = state.z;
record1.h = state.yaw;
record1.p = state.pitch;
record1.r = state.roll;
record1.playid = nnplyr;

record5.rectype = init.rectype;
record5.numflds = init.numflds;
record5.playid = init.iconid;
record5.label = init.label;

r1info.numrecs = numplyr;

r5info.numrecs = numrec5s;

terminate = terminate;

Percent_loading = Percent_loading eof
```

Fig. 8

| Event Sequence | | | | |
|---|---|---|---|---|
| Event | Model | Master Side Interface | Slave Side Interface | RTI |
| 1 | Start Model | | | |
| 2 | Initialize IPC's | | | |
| 3 | Calculate 1st Time Slice | | | |
| 4 | Write Slice to Memory | | | |
| 5 | Give_Sem (READSEM) | | | |
| 6 | Calculate Next Time Slice | | | |
| 7 | Get_Sem (WRITSEM) | | | |
| 8 | | Start Master Interface | Start Slave Interface | |
| 9 | | Anlyze Con-figuraton Files | | Start RTI |
| 10 | | Initialize IPC's | | Initialize IPC's |
| 11 | | Pass Configur-ation Info to Slave | Receive Con-figuration Info | Get_Sem (READSEM) |
| 12 | | Get_Sem (READSEM) | Initialize IPC's | |
| 13 | | Pass First Time Slice | Receive First Time slice | |
| 14 | | Wait for Slave to Pass Go Ahead Signal | Give_Sem (READSEM) | |
| 15 | | | Polling Loop to Read "1" in Control Signal | Read First Time slice |
| 16 | | | | Give_Sem (WRITSEM) |

Fig. 9a

|    |                              |                              |                              |                                                              |
|----|------------------------------|------------------------------|------------------------------|--------------------------------------------------------------|
| 17 |                              |                              |                              | When User Presses Un-Pause Write "1" to Control              |
| 18 |                              | Receive Go Ahead Signal      | Send Go Ahead Signal         |                                                              |
| 19 |                              | Give_Sem (WRITSEM)           | Get_Sem (WRITSEM)            |                                                              |
| 20 | Start Steady State           | Start Steady State           | Start Steady State           | Start Steady State                                           |
| 21 | Write Slice to Shared Memory |                              |                              | Stay in Main Display Loop Until READSEM is Available         |
| 22 | Give_Sem (READSEM)           | Get_Sem (READSEM)            |                              |                                                              |
| 23 | Calculate Next Time Slice    | Pass Time Slice to Slave     | Receive and Write Time Slice |                                                              |
| 24 | Get_Sem (WRITSEM)            | Give_Sem (WRITSEM)           | Give_Sem (READSEM)           | Get_Sem (READSEM)                                            |
| 25 | Go to Start Steady State     | Go to Start Steady State     | Get_Sem (WRITSEM)            | Read Time Slice                                              |
| 26 |                              |                              |                              | Give_Sem (WRITSEM)                                           |
| 27 |                              |                              | Go to Start Steady State     | Go to Start Steady State                                     |

Fig. 9b

RUN-TIME DYNAMICALLY ADAPTIVE COMPUTER PROCESS FOR FACILITATING COMMUNICATION BETWEEN COMPUTER PROGRAMS

The present invention relates to digital computers and computer programs, and particularly to interfaces for communicating data between computer programs. More particularly, the invention relates to run-time dynamically adaptive computer processes that automatically configure themselves to facilitate communications between dissimilar software programs, which may be run on the same computer, or on two remotely located computers through a communication link.

BACKGROUND OF THE INVENTION

The use of simulations as analysis tools has experienced tremendous growth over the past decade. This growth has caused the evolution of many legacy models which, unfortunately, have evolved using many obsolete programming techniques. Many of these models were developed when graphical user interfaces and graphical display capabilities were either too immature or too expensive to incorporate into the modeling process. It is now well recognized that graphical user interfaces can relay magnitudes of information that text based interfaces can never achieve.

Engagement simulations can generate value based information (such as Probability of Survival, etc.) and output that information to log files or to a display. The analysis of player positions and interactions based on positions in three dimensional space is very difficult to understand in a text based interface. Analysis becomes even more difficult when many simulated players are involved. These difficulties encountered in the analysis of simulations prompted the development of utilities to graphically display the simulation results as a function of simulation time. While these utilities were widely accepted in the simulation community, they were only available for select simulations, and therefore of limited utility.

Generic visualization tools were developed that allowed post-processing analysis. That is, the tools allowed for reading a file of information that held the simulation results to be displayed by the visualization tool. The generic tool then provided the capability for any simulation to create the visualization tool's input data file, allowing the simulation user to "see" the results. Unfortunately, these visualization tools only allowed after-the-fact analysis. A need existed to quickly interface an engagement simulation to a visualization tool on a run-time basis so that the visualization user can "watch" as the simulation progresses.

Interfacing methodologies have been developed to provide a run-time visualization. These methodologies involve software modifications for coding the visualization tool data requirements into the simulation. That is, the interface is designed for the visualization tool's data requirements and the simulation data must be "force fit" into the specific interface. Thus, each simulator/visualization tool combination requires a dedicated interface. Such dedicated interfaces are very costly to develop and debug, and thereby add to the development costs of new simulator and visualization software. Moreover, these dedicated interfaces require recompiling any time simulator or visualization tool variables are changed, thereby reducing their convenience of use. Thus, a need exists for a generic run-time reconfigurable interface that can dynamically adapt the output data of any one computer program to the input requirements of any other computer program. Further, the interface should provide uni- or bi-directional communication between any number of dissimilar computer programs.

SUMMARY OF THE INVENTION

The present invention provides a generic, run-time configurable interface that dynamically adapts the output of a first program to the input requirements of a second program so that the second program can operate on or use the results of the first program during the run-time of the first program.

According to the present invention, an interface for facilitating communications among a plurality of computer programs connected to each other by a communications program includes a template file for each of the plurality of computer programs, a plurality of equality files and means for transmitting equated data between the computer programs. Each template file defines data for its respective computer program and allocates memory for the data. Each equality file equates data of one of the computer programs with data of another of the computer programs.

According to one aspect of the invention, a template file for each computer program defines the input and output data of the program and maps the input and output data to separate blocks of shared memory, which may be a shared memory in one computer, or the separate memories of two or more computers linked through the interface. The transmitting means includes a master interface that communicates with the first of the computer programs through a first block of shared memory and a slave interface that communicates with the second computer program through a second block of shared memory.

According to another aspect of the invention, each template file defines the data of its respective computer program and allocates that data to shared memory in the data structure and format of its respective computer program.

The master interface includes means for converting the output data of the first program from the data structure and format of the first computer program to the data structure and format of the second computer program. The converting means includes a lexical analyzer for analyzing the template files and a memory mapper for allocating memory for data to be passed between the first and second computer programs. The memory mapper analyzes data and allocates memory based on the contents of the equality file that equates the data of the first computer program with the data of the second computer program.

By providing template and equality files, a lexical analyzer, and a memory mapper, the present invention provides a generic, uni- or bi-directional run-time reconfigurable interface that can dynamically adapt the output data of one computer program to the input computer requirements of another computer program.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

FIG. 6 is an illustrative template file for a first computer program;

FIG. 7 is an illustrative template file for a second computer program;

FIG. 8 is an illustrative equality file for equating the data structures and formats of the first and second computer programs; and FIGS. 9a–9b provide the event sequence during the initialization of the first and second programs and the interface to steady state operation.

DETAILED DESCRIPTION OF THE DRAWINGS

The interface of the present invention is a software program that provides a dynamic interface between two dissimilar software programs that must communicate with each other, whether running on one or a plurality of computers. The invention can provide bi-directional, non-intrusive data manipulation and communications between software programs on a distributed computing platform or across platforms on a distributed network. The concept is based on user-created template files, similar to a programming language header file, that is read during run initialization and used to automatically reconfigure the interface communications.

Figure 1:
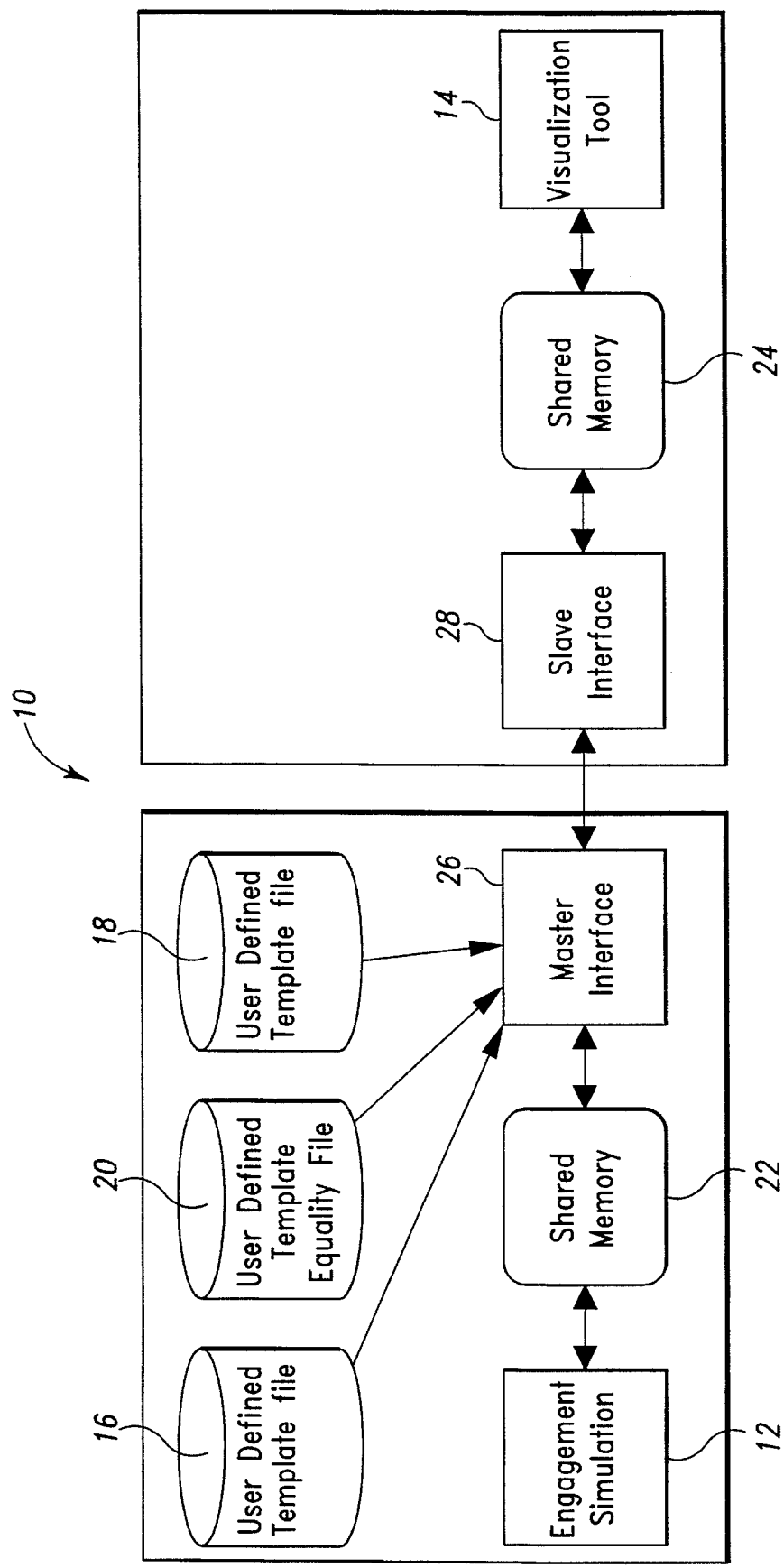
FIG. 1 diagrammatically represents an interface connecting two separate computer programs by using a master interface and a slave interface.

In one application of the invention, shown in FIG. 1, the interface 10 transmits data from a first computer program 12, illustratively an engagement simulation model running on one platform, to a second computer program 14, illustratively a visualization tool for graphically displaying the results of the simulation, operating on another platform. The interface 10 includes first and second user defined template files 16, 18, a user defined template equality file 20, first and second blocks of memory 22, 24, a master interface 26 and a slave interface 28. The master side block of memory 22 and the slave side block of memory are, in many applications, shared portions of a memory device on the master side; however, the slave side portion of the memory can be a part of a separate remote slave side computer system operating through the interface. For convenience, the description of the invention will refer to a first (or master side) block of memory 22 and a second (or slave side) block of memory 24. "Master" and "slave" and "master side" and "slave side" refer to different program functions, not physical locations. As noted above, all programs may be running on a single computer.

The first template file 16 defines the output and input data of the simulation model 12, configures the first block of memory (master side) 22 to the specs (data structure and format) of the simulation model 12, and maps the output and input data of the simulation model 12 to the first or master side block of memory 22. The second template file 18 defines the output and input data of the visualization tool 14, configures the second block of memory (slave side) 24 to the specs (data structure and format) of the visualization tool 14 and maps the output and input data of the visualization tool 14 to the second or slave side block of memory 24. The template equality file 20 equates the input data and output data of the simulation model 12 with the output data and input data of the visualization tool 14, respectively, based on the contents of the equality file 20.

The master interface 26 takes data from the first master side block of memory 22 and reconfigures the data, based on the contents of the equality file 20, to match the specs of the visualization tool 14. The master interface 26 loads the reconfigured data into the second or slave side block of shared memory 24. The visualization tool 14 takes the reconfigured data from the second slave side of memory 24 and updates the display.

The interface 10 of the invention requires template files 16, 18 and the equality file 20 at start-up in order to properly initialize itself. The first template file 16 lets the master interface 26 know the definitions of the record types stored in the first block of master side memory 22, how the records are mapped to the first block of master side memory 22, the key value to access semaphores and shared memory, and which control records are defined for which data records. The second template file 18 performs the same function as the first template file 16, but for the slave interface 28 and the second block of slave side memory 24.

The first and second template files 16, 18 are similarly structured, and as shown illustratively in FIGS. 6–7, include three sections with nine different types of statements. The three sections include an input section, an output section, and a configuration section. The nine statement types include a declaration statement, a record definition compound statement, a semkey declaration statement, a memory declaration statement, a control declaration statement, an end of file statement, a host statement, a path statement and a section definition statement. Statements have a very precise form and order that must be followed for the interface 10 to successfully configure itself. FIGS. 6–7 can be used as examples of proper template files.

Some preliminary definitions for elements of statements are:

Identifier: a sequence of letters and digits and periods that must begin with a letter.

Keywords: the following is a list of words reserved as keywords and may not be used otherwise

| begin | short | host |
| end | for | path |
| record int | control is | CONFIGURATION |
| float | semkey | SECTION |
| long | INTERFACE | FILE |
| memory | eof | INPUT |
| char | equality | OUTPUT |

Punctuation: the following is a list of punctuation used in statements

: ; = [ ] { }

Type: valid type declarations are int short int long int float long float char

1. Declaration Statements: declaration statements take the form:

<Identifier>:<type>;

A Declaration List is one or more declaration statements. Examples of valid declaration statements are:
time:float;
name:char[128];
terminate:int;

2. Record Definition Compound Statements: record definition statements take the form
record<Identifier>
begin
    Declaration List
end An example of a valid record statement is:
record record5
begin
    rectype:int;
    numflds:int;
    playid:int;
    iconid:int;
    label:char[20];
end In the current syntax, it is illegal to define a record and then use that record as a type in a declaration statement. In order to simulate such nesting, use the "dot" notation to indicate sub-fields of an identifier. A C declaration sequence of

```
typedef struct foo {
    int a;
    float b;
}FOO;
struct bar {
    FOO q;
}
``` can be represented in the current syntax as record bar
begin
    q.a: int;
    q.b: float;
end Since memory is linear anyway, this reduces all records to their "linear" representation and more accurately defines the relative location of the fields of the record in memory.

3. Key Declaration Statement: a key declaration statement takes the form
semkey=<number>;

The number passed as the semkey must be the same as the number the connecting application uses for a key when it creates shared memory and semaphores. An example of a valid semkey statement is:
semkey=2314;

4. Memory Declaration Statement: a memory declaration statement takes the form
memory<Identifier>[<number>];

The <Identifier> must be a previously defined record or declaration Identifier. <Number> gives the number of slots in memory of this record type that exist. The order of these statements defines the order of the blocks of records in memory to the interface so it is very important that the order of the statements exactly match the actual order of the record blocks. Additionally, the stated size of the record block must match the number actually used in memory by the application for the interface to match the input data to the output requirements correctly.

The interface supports a control field so that an application can communicate with the interface and send control signals. In order to signify the location and significance of this special record to the interface, the keyword INTERFACE has been defined. Simply insert the declaration "memory Interface;" in the correct order location in the input file to designate the location of the control record. The control record is defined as a single integer and the only command currently implemented is "−1", signifying terminate. An example of a valid memory statement is:
memory record5[200];

5. Control Declaration Statement: the control declaration statement takes the form
control for<Identifier1> is <Identifier2>;

where both Identifiers have been previously defined by declaration or record statements. <Identifier1> should be a record that has memory block in which all slots may not need to be passed in every time slice. <Identifier2> will give the number of records that should be passed for the time slice. <Identifier2> will be checked and only the number of records of type <Identifier1> specified by the value of <Identifier2> will pass for the time slice. This allows a convenient mechanism for passing a variable number or records while declaring a large enough memory block to handle all possible data situations. <Identifier2> can only represent an integer with a block size of 1. An example of a control declaration statement is
control for record5 is r5info;

6. End of File Marker: an end of file marker must be placed as the last statement in the file. It is the keyword "eof" and must also have at least 1 carriage return/line feed after it. The end of file delimiter is necessary to properly separate the analysis of the input files.

7. Section Definition Statement: a section definition statement takes the form
SECTION: <Type>
The <Type> is one of input, output or configuration as appropriate.

8. Host Statement: a host statement takes the form
Host <name>;
The <name> is the name of the host computer for the template file's respective program.

9. Path Statement: a path statement takes the form
path <pathname>;
The <pathname> is the pathname to where the interface is installed on the host computer.

The output data structures for the simulation model 12 should be the same as the normal data structures that are used during its execution. There is no need to change any existing data structure to fit the visualization tool format since the interface 10 will do this automatically during run time. There is a need, however, to ensure that all of the individual data input requirements of the visualization tool 14 are met by some part of the output of the simulation model 12. Data structures in the simulation model 12 must be found which contain the appropriate information for every field of every record defined by the visualization tool template file 18. This is accomplished in an equality file 20 as illustratively shown in FIG. 8.

The equality file 20 maps a model output record field of the simulation model 12 to a model input record field of the visualization tool 14. The equality file 20 allows the interface 10 to map spots from the first block of memory 22 to matching spots in the second block of memory 24. This mapping is what provides run-time reconfiguration. That is, the mapping allows the interface to pick apart records on the master side of the interface and output them in the correct format on the slave side.

The equality definition file has the following form equality

<Identifier1>=<Identifier2>; (more equality statements as necessary)

eof

The file must have as its first statement the keyword "equality" followed by any number of equality statements and terminated by the "eof" file delimiter keyword. The equality statement has two identifiers. <Identifier1> is a field of a record or declaration in the visualization tool's configuration file and <Identifier2> is a record field or identifier in the simulation model configuration input file. These equality statements show the mapping between output data of the simulation model 12 on the master side and the input data of the visualization tool 14 on the slave side. Note that all of the visualizations tool's input requirements must be met by some field or record of the simulation model's output. As currently implemented, there is no null statement for the simulation model's output, but the model can "fudge" a null by declaring a field in the memory with a zero value and directing a non-essential visualization tool input record to that field. FIG. 8 can be used as an example of a proper equality file.

A potential problem to consider occurs when the visualization tool input record references two or more simulation model output records. The block size for each simulation model output record should be equal. Otherwise, the master attempts to access past a simulation model output block's memory limits. In general, it is prudent to use the same block sizes for simulation model output records and their corresponding visualization input records.

It is possible to make a visualization tool input record that has a block size greater than "1" reference, a model output record with a block size of "1". The interface will repeatedly write the same model output information to multiple visualization tool input spots if and only if the output block size is found to be "1". This feature can be useful for model output information that is the same for many visualization tool input records, such as the time stamp.

Figure 2:
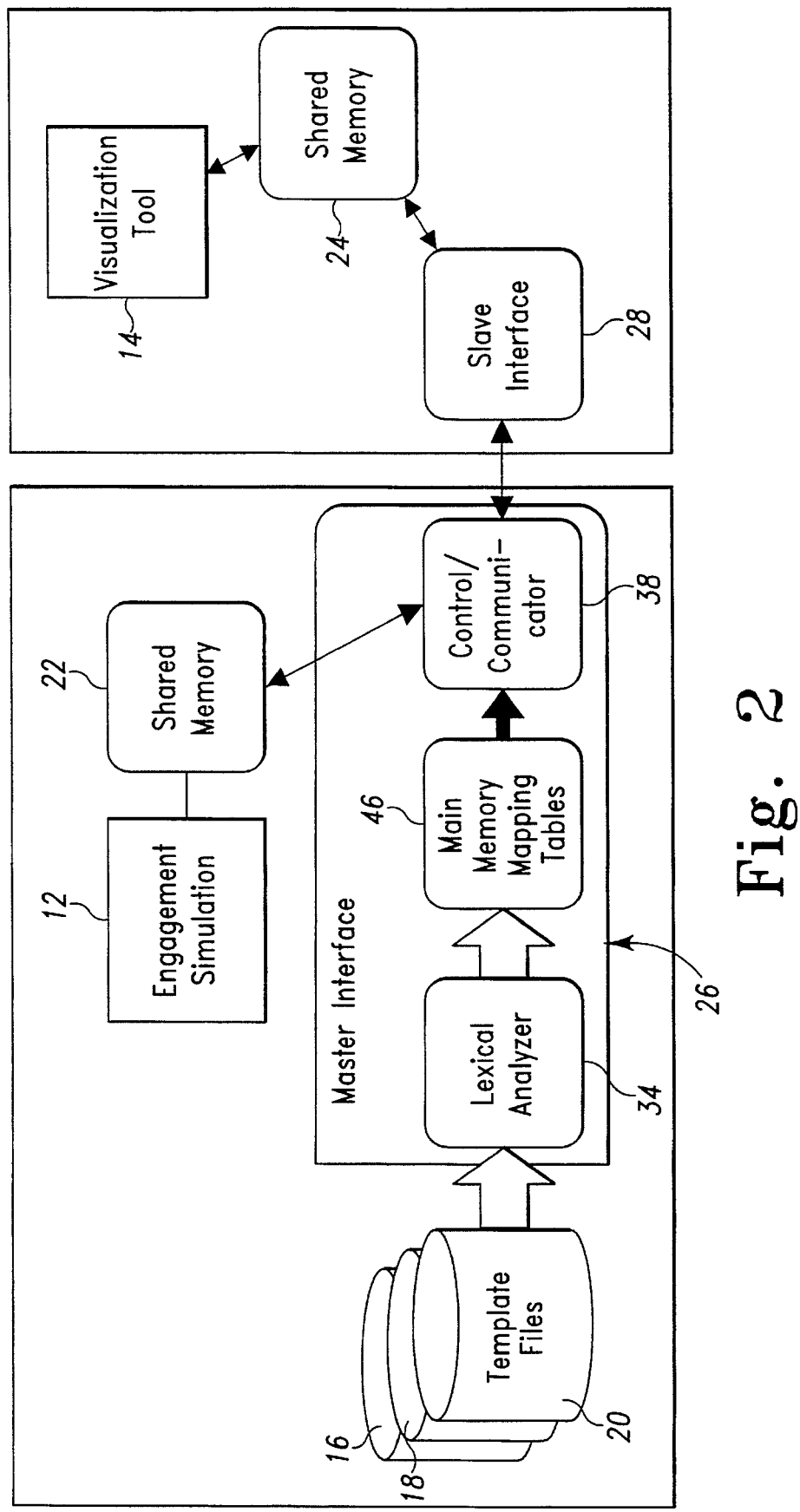
FIG. 2 diagrammatically represents the configuration and execution of the interface.
Figure 3A:
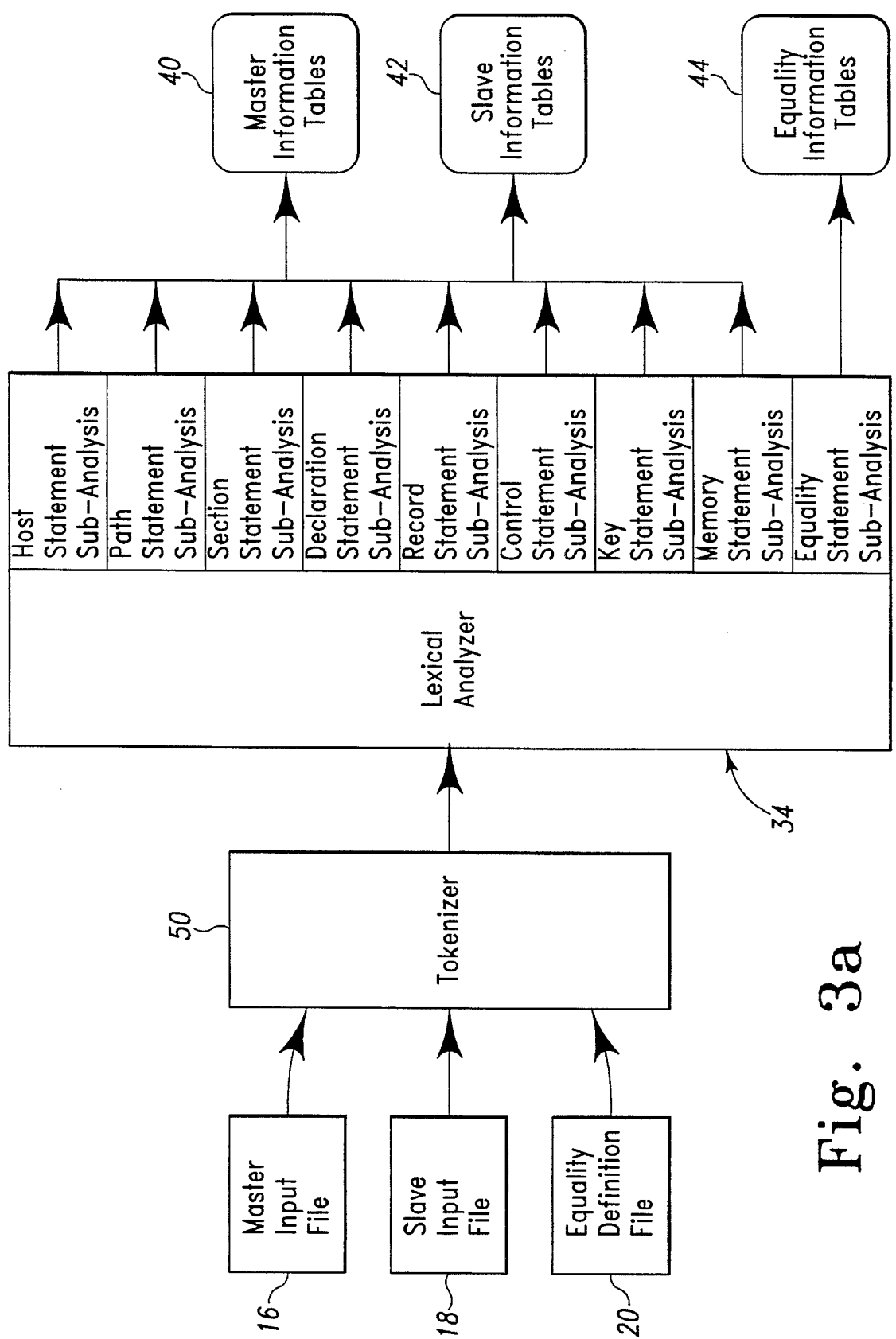
FIG. 3a diagrammatically represents the process of lexical analysis.

FIGS. 2, 3*a* and 3*d* illustrate master interface 26 in greater detail.

Referring to FIG. 2, the template files 16, 18 are fed into a lexical analyzer 34 which converts the template file information into an internal form usable by a memory mapper 36 (FIG. 3*b*), which in turn loads the information into main memory mapping tables 46. A control/communicator 38 takes the simulation model data and reconfigures that data, using the information in the main memory mapping tables 46, to match the requirements of the visualization tool 14. The reconfigured data is written into the second slave side block of memory 24. The visualization tool 14 reads the reconfigured data and updates the display.

Figure 3B:
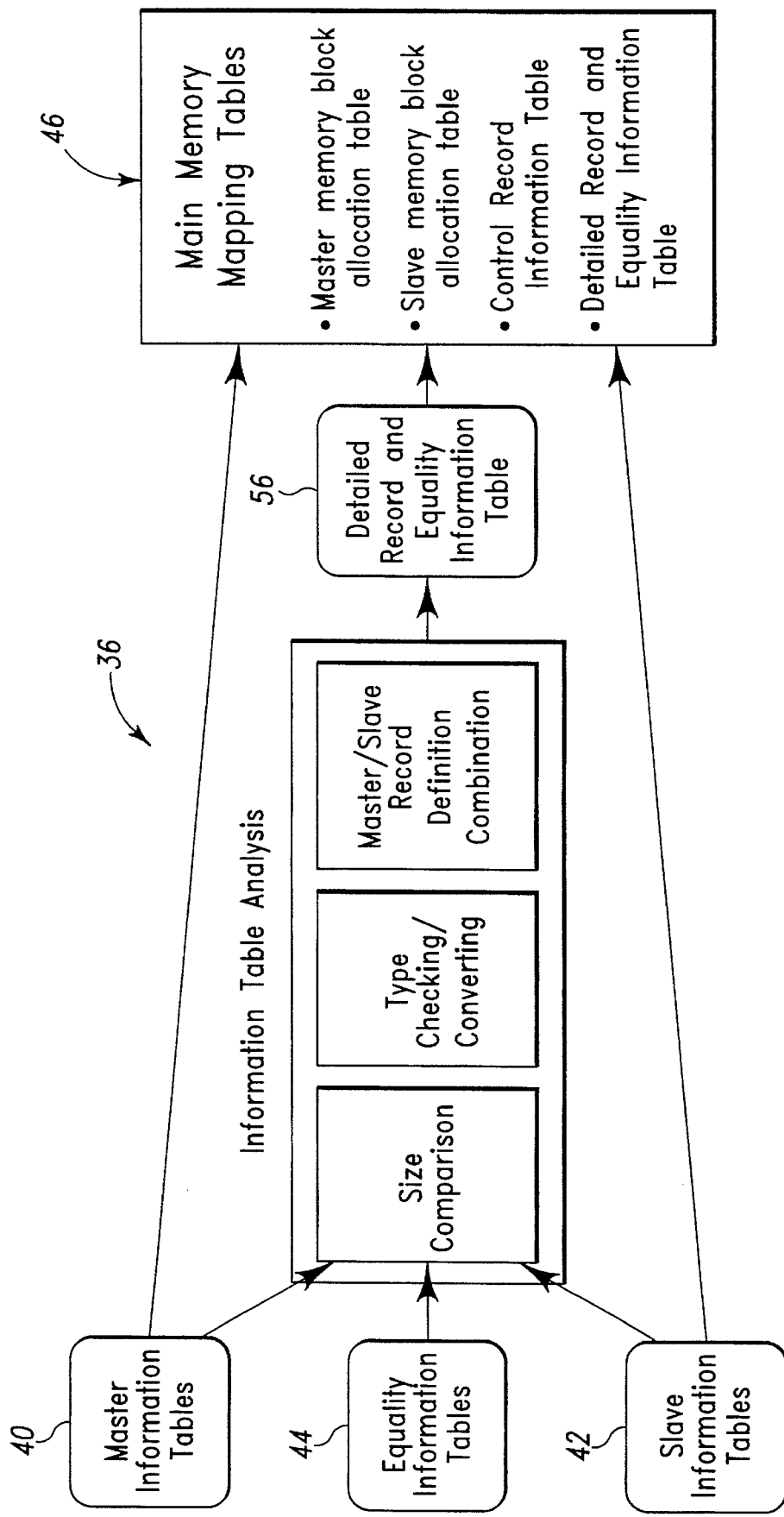
FIG. 3b diagrammatically represents the process for creation of the main memory mapping tables.

The flow of information in master interface 26 from the template files 16, 18 and the equality file 20 to the main memory mapping tables 46 is shown in more detail in FIGS. 3*a*–3*b*. The lexical analyzer 34 determines the correctness of the template file statements, extracts information from the statements, converts the information into a format usable by the interface 10, and stores that information in information tables 40, 42, 44. Once the data is input to the information tables, the memory mapper 36 analyzes the information and creates the main memory mapping tables 46.

Referring to FIG. 3*a*, the information from the template files 16, 18 and the equality file 20 is input to a tokenizer 50 as a stream of characters. The tokenizer 50 breaks up the stream of characters into groups, or tokens, according to rules defined in the analyzer 34. The tokens are organized into statements which comprise the smallest piece of meaningful information and include keywords, punctuation and identifiers. The lexical analyzer 34 uses a four step process to analyze the tokens.

In the first step, the analyzer 34 looks at the first token in a statement, which tells the lexical analyzer what type statements follow.

Since each statement type requires different operations to be performed on the information retrieved, a separate section was created for each statement type. Accordingly, the second step of the analysis involves calling up an appropriate sub-analysis, based on the contents of the first token.

The third step in the analysis involves examining the remainder of the statement using syntax rules for that statement type. Data such as type, identifier and size are extracted from the statement and held until the end of the statement is reached. If a syntax error is found, the whole analysis stops, and error message is printed and the interface terminates. If the end of the statement is reached without an error, the data is transferred to the information tables 40, 42, 44, as shown in FIG. 3*a*. The lexical analyzer also creates a detailed record information table (DRIT) 56.

Figure 4:
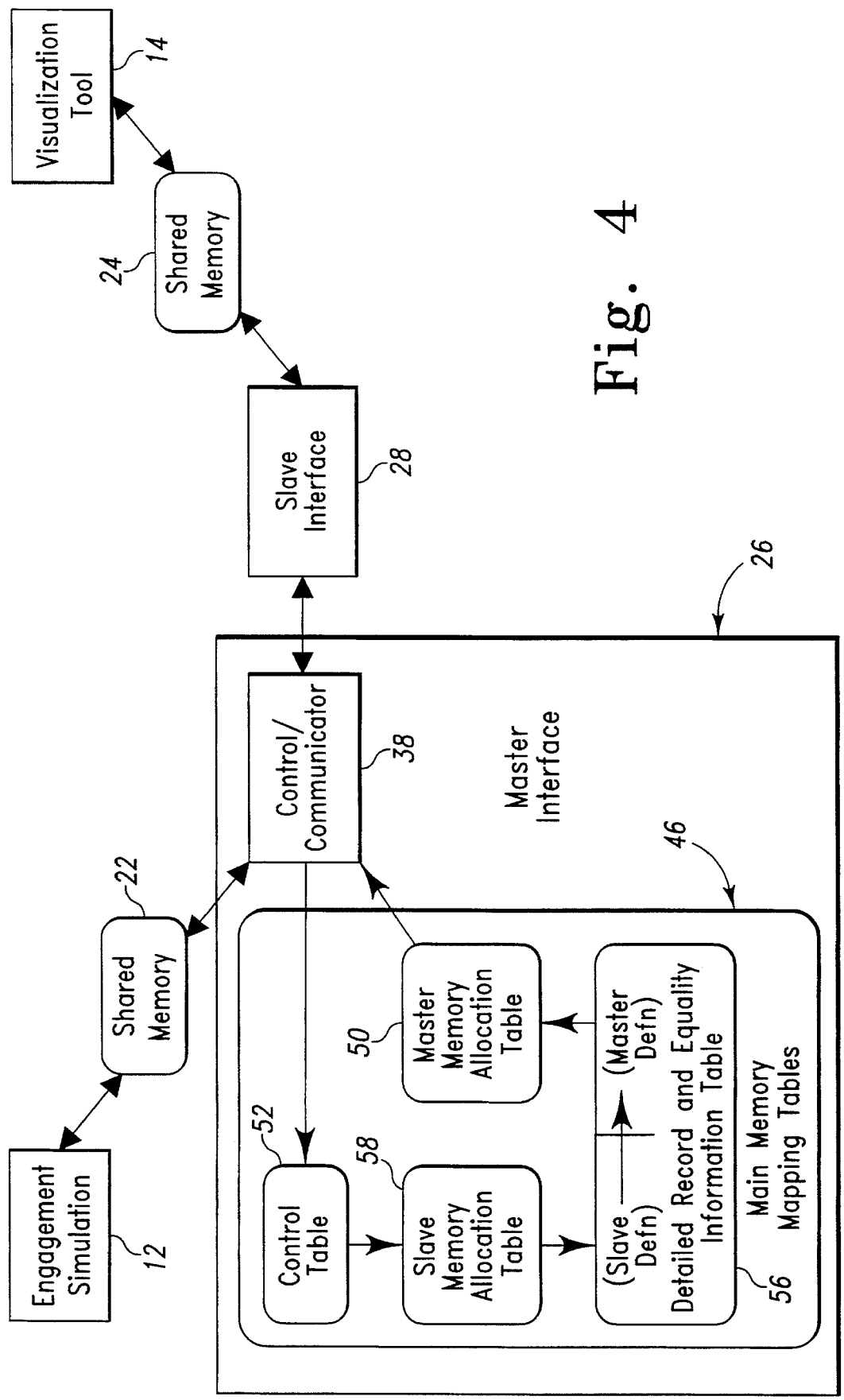
FIG. 4 diagrammatically represents the flow of data within the master interface during initialization.

Once all of the declaration information has been extracted from the template and equality files 16, 18 and 20, respectively, the interface analyzes the DRIT and creates main memory mapping tables 46, as shown in FIG. 3*b*. As shown in FIG. 4, there are three main memory mapping tables for each of the master and slave configuration files which include a control table (CONTAB), a slave memory allocation table 58, a memory block allocation table (MBAT) 50, and the DRIT 56. The MBAT 50 provides detailed information on the layout of the memory 22, 24 and the CONTAB 52 associates a control record with a memory block. The DRIT 56 contains information on the type, size and some location information for every field of every record.

The lexical analyzer creates a DRIT 56 for both the master and slave side of the interface, and each DRIT is placed with the corresponding side's information tables. Once the information is extracted from the template and equality files 16, 18, 20, the DRITs are analyzed.

The analysis of the DRITs and the creation of the main memory mapping tables 46 are shown diagrammatically in FIG. 3*b* and includes matching the equality information to the master and slave information contained in the respective DRITs. Each declared equivalent pair is checked for byte size compatibility and type compatibility. If the size and types match, both the master and slave information is put into a detailed record and equality information table (DREIT) 56. If the types don't match, as for example when the input requires an integer data type and the corresponding output is a floating point data type, the memory mapper 36 converts the data as appropriate and stores the converted data type in the DREIT 56. The master MBAT 50, slave MBAT 58, and the CONTAB 52 cooperate with the DREIT 56 to let the master interface 26 know the read and write memory positions of the equivalent records. The main memory mapping tables 46 provide all of the information necessary for the master interface control and communicator 38 to pass the exact information required by the slave interface 28 (FIG. 4) in the order and type required. Portions of the main mapping tables 46 are sent to the slave interface 28 so that the location for the received information can be determined.

Figure 5:
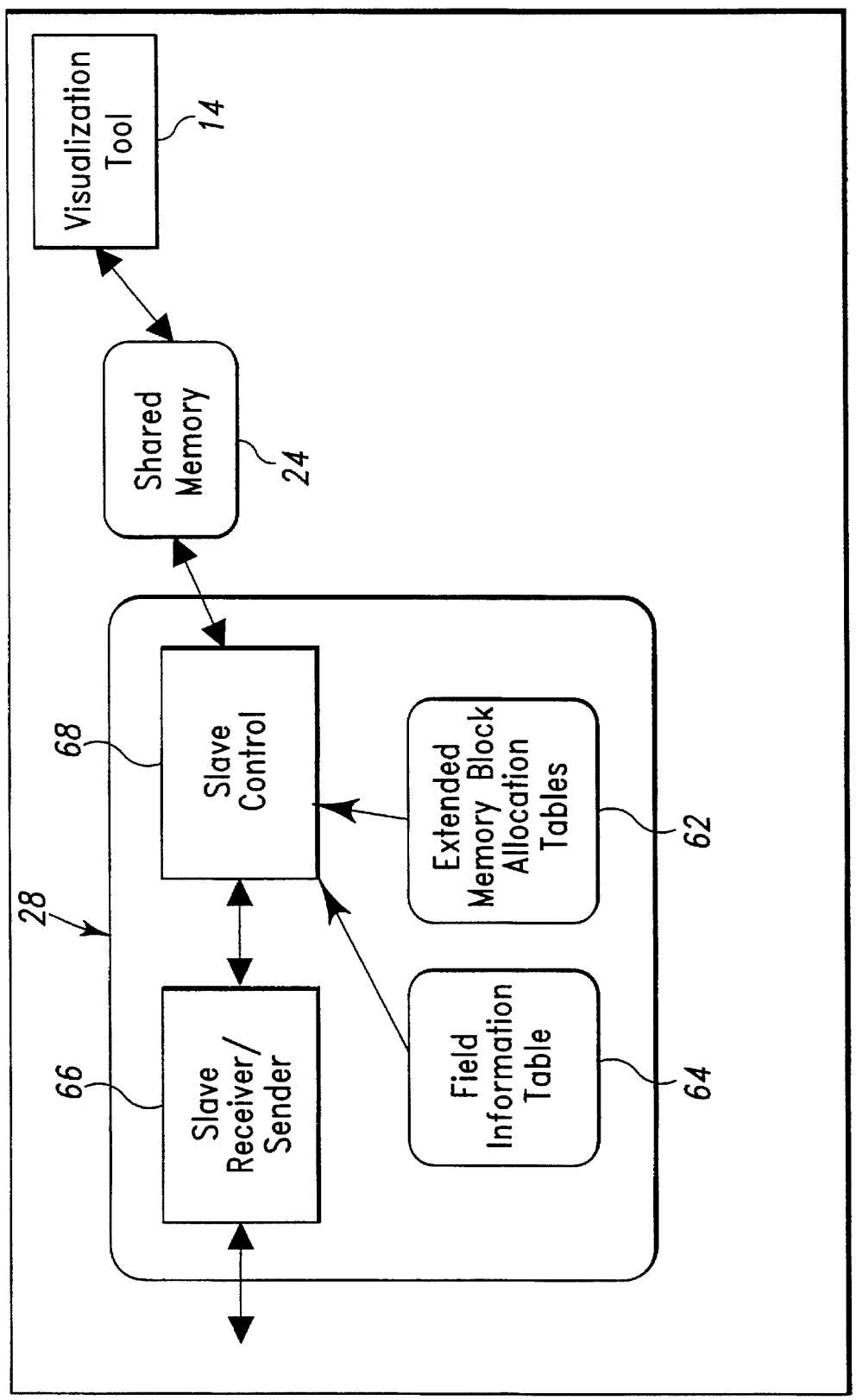
FIG. 5 diagrammatically represents the flow of data within the slave interface.

Proceeding with the master interface initialization, after completing the lexical analysis and information analysis processes, the master interface control and communicator 38 passes a modified version of the slave MBAT 58 and slave DRIT to the slave interface 28, as shown diagrammatically in FIGS. 4–5. FIG. 5 illustrates slave side memory 24 as part of slave interface 28).

Slave interface 28 has an expanded memory block allocation table (XMBAT) 62; which is an expanded version of the slave memory allocation table 58 that exists on the master interface side of the interface. The XMBAT 62 contains the record type and memory address of every individual record located in the slave side memory 24 and provides quick access to the record type and position in the slave side memory 24 by assigning a simple number identifier to each position.

The modified slave DRIT contains the data type for each field of a record and is called the field information table (FIT) 64. The FIT 64 is accessed by the same record identifiers used by the XMBAT 62, thus letting the slave interface 28 know the structure of the record referenced by the XMBAT. Once the main mapping tables 46 are created on the master interface 26 and the slave tables have been created and passed, the master interface control and communicator 38 is ready to pass information from the simulation model 12 to the visualization tool 14.

The master interface control and communicator 38 on the master interface 26 is responsible for passing only the required information to the slave interface 28 in the correct order and quantity required. The master interface control and communicator 38 uses the main memory mapping tables 46 to obtain the read and write locations for each piece of data, and uses a three step precess to pass each record block of information to the slave interface 28, as shown diagrammatically in FIG. 4.

First, the master interface control and communicator 38 accesses the CONTAB 52 to determine if a control record exists for the record block. If so, the number located in that record will determine the number of records to be passed to the slave interface 28. Otherwise, the entire record block will be passed. Second, the master interface control and communicator 38 finds the slave record number and record location from the slave MBAT 58.

Finally, for each field of the record type to be passed, the master interface control and communicator 38 (1) finds the equivalent master side record field information from the DRIT 56, (2) finds the location in the master side shared memory 22 of the record field by accessing the master MBAT 50, and (3) sends the record field.

Coordination between the master interface 26 and slave interface 28 is achieved by having the master interface control and communicator 38 send control signals to tell the receiver 66 of the slave interface 28 what information to expect next. The information following the control signal tells the slave control 68 the position to access in the XMBAT 62 and FIT 64 tables. Thus, the control signals allow the slave interface 28 to correctly interpret all information passed by the master interface control and communicator 38 and place the information in the correct position in the slave side memory block 24 using a three step process, shown diagrammatically in FIG. 5.

First, the slave interface 28 receives a control signal from the slave receiver/sender 66 indicating that a record is to be received. Second, it receives a number which is the position of the record in shared memory. The slave control 68 uses this number to know the type of the record and, therefore, the structure of the record by accessing the XMBAT 62 and FIT 64. Third, the slave control 68 receives the record information as defined by the FIT 64 and writes the information to slave side memory 24.

Once all of the record blocks have been passed across the interface 10 and placed into the visualization tool's slave side memory 24, the slave control 68 releases control of slave side memory 24 so the visualization tool 14 can display the information. When control of slave side memory 24 is released back to the slave control 68, it is ready to receive the next set of record blocks from the master control and communicator 38. The process continues until the termination of the simulation scenario.

In order to control the flow of communications across the memory blocks 22, 24, the interface uses a scheme of semaphores, which are the means by which the synchronization of reads and writes from and to memory block is 22, 24 are coordinated between the first computer program 12 and the master interface 26 and between the second computer program 14 and the slave interface 28. For example, the semaphore scheme allows the simulation model 12 to write a time slice to master side memory 22 while simultaneously preventing the master interface 26 from reading the information until the simulation model 12 is done writing. Conversely, once the master interface 26 begins to read a time slice, the simulation model 12 will be prevented from writing the next time slice to the master side memory 22 until the master interface 26 is done reading. The correct use of the semaphores ensures that only one portion (i.e., master side or slave side) side of the memory will have access to memory and therefore ensures that all the data for one time slice remains as a complete package.

Illustratively, two semaphores, called READSEM and WRITSEM, guard the memory blocks 22, 24 for mutual exclusion between the simulation model 12 and the master interface 26 and between the visualization tool 14 and the slave interface 28. Separate, but identical, READSEM and WRITSEM semaphores are implemented as flags on the master and slave side of the interface 10. Both sets of READSEM and WRITSEM flags have allowed values of 1 or 0.

In order to use the flags, two procedures named Give__Sem and Get__Sem have been implemented. A call to Get__Sem decrements the READSEM or WRITSEM flag value from 1 to 0. If a call to Get__Sem finds a flag value of 0, the issuer of the call waits for the flag value to change to 1. If the call to Get__Sem finds that the flag value is 1, the flag is decremented from 1 to 0 and the call issuer reads or writes, as appropriate. A call to Give__Sem increments a flag value of 0 to 1. If properly implemented, the call to Give__Sem always sees a 0, which it increments to 1, allowing the other side of the shared memory to read or write, as appropriate.

The calls to Give__Sem and Get__Sem must be placed at the correct location in the applications on both the master and slave sides of the memory for the synchronization of the reads and writes to function properly. The event timings for both initialization and steady state are critical for the proper operation of the computer program/memory/interface combinations. An illustrative initialization and steady state event timing table is shown in FIGS. 9a–9b.

The operator starts the simulation model 12, which proceeds through the initialization events of initializing IPCs and calculating the first time slice (events 2–3). The simulation model 12 writes the first time slice to master side memory 22 (event 4), issues a call to Give__Sem READ- SEM (event 5), calculates the next time slice (event 6) and issues a call to Get_Sem WRITSEM (event 7). Of course, at this time the WRITSEM flag value is 0, so that the simulation model 12 waits until the Get_Sem WRITSEM sees a flag value of 1.

After the simulation model 12 has started, the operator starts the master interface 26, which in turn automatically starts the slave interface 28 (event 8). During startup and initialization of the interface 10, both sets of READSEM and WRITSEM flags are set to 0. By this time, however, the Give_Sem READSEM is ready to, and does, increment the READSEM flag to 1, based on the call to Give_Sem READSEM in event 5. The master interface 26 proceeds to analyze the configuration files, initialize the IPCs and pass the configuration information to the slave interface 28 (events 9–11). The master interface 26 then issues a call to Get_Sem READSEM and checks the value of the READSEM flag (event 12). Since the READSEM flag value was just incremented to 1 by the call to Give_Sem READSEM, the master interface 26 reads the first time slice from the master side memory 22, decrements the READSEM flag value to 0, and passes the first time slice to the slave interface 28 (event 13). At this point, the master interface 26 pauses to wait for the go ahead signal from the slave interface 28 (event 14), and both READSEM and WRITSEM flags are set to 0.

After start up in event 8, the slave interface 28 receives the configuration information, initializes the IPCs, and receives the first time slice and writes it to slave side memory 24 (events 11–13). The slave interface 28 then issues a call to Give_Sem READSEM (event 14), which automatically increments the flag value to 1, and waits for the visualization tool 14 to come on line and accept the first time slice.

After starting the simulation model 12 and the interface 10, the operator starts the visualization tool 14 (event 9). The visualization tool 14 initializes the IPCs and issues a call to Get_Sem READSEM (event 11). Since the slave interface 28 previously incremented the READSEM flag value to 1 in event 14, the call to Get_Sem decrements the READSEM flag value to 0. The visualization tool 14 reads the first time slice from slave side memory 24 (event 15), issues a call to Give_Sem WRITSEM, which increments the WRITSEM flag value to 1 (event 16), and issues a call to Get_Sem READSEM. Since the READSEM flag is 0, the visualization tool 14 waits for a READSEM flag value of 1. At this point, the simulation model/interface/visualization tool system is ready to go into steady state operation.

The visualization tool 14 sends a go ahead signal to the slave interface 28, and the slave interface 28 receives the go ahead signal and passes it on to the master interface 26 (event 18) and issues a call to Get_Sem WRITSEM (event 19), which decrements the WRITSEM flag value to 0. At this point, the slave is ready to receive the next time slice from the master interface 26 and write it to slave side memory 24. As with the master side of the interface, all READSEM and WRITSEM flag values are set to 0.

Upon receipt of the go ahead signal from the slave interface 28, the master interface issues a call to Give_Sem WRITSEM (event 19), which increments the WRITSEM flag to 1, enters steady state operation, and issues a call to Get_Sem READSEM (event 22). However, the READSEM flag is 0 at this time, so that the master interface 26 waits for the READSEM flag to go to 1.

The simulation model 12 has been waiting (since event 7) for the WRITSEM flag value to be 1. Thus, as soon as the master interface 26 issues the call to Give_Sem WRITSEM, the simulation model 12 writes the second time slice (previously calculated in event 6) to master side memory 22 (event 21) 21, decrements the WRITSEM flag to 0, issues a call to Give_Sem READSEM (event 22), incrementing the READSEM flag value to 1, calculates the next (third) time slice (event 23) and issues a call to Get_Sem WRITSEM.

The call to Get_Sem READSEM from the master interface 26, issued in event 22, decrements the READSEM flag to 0, and the master interface 26 reads the second time slice from master side memory 22 and passes the time slice to the slave interface 28 (events 22–23). The slave interface 28 receives the second time slice, writes it to slave side memory 24 and issues a call to Give_Sem READSEM, which increments the READSEM flag to 1. The visualization tool 14 has been waiting for a READSEM flag value of 1 since event 24. Consequently, the Get_Sem READSEM decrements the READSEM flag to 0 and the visualization tool 14 reads the second time slice from the master side memory 24 and issues a call to Give_Sem WRITSEM, incrementing the WRITSEM flag to 1. At this point, the simulation model/interface/visualization tool system has transitioned into steady state operation.

During steady state operation, the master interface 26 and the simulation model 12 continue to write to and read from master side memory 22 under the control of the WRITSEM and READSEM semaphores, as previously described. Likewise, the slave interface 28 and the visualization tool 14 continue to write to and read from slave side memory 24, also under control of the semaphores. Data passes from the master interface 26 to the slave interface 28 when the master interface 26 has completed reading the (current) time slice from shared master side 22 and the slave interface 28 has issued the call to Get_Sem WRITSEM and is ready to receive the data from the master interface 26.

Although the invention has been described in detail with reference to a simulation model and visualization tool, it will be appreciated that the interface of the present invention is equally applicable to other combinations of programs. It will be further appreciated that the interface of the invention is not limited to use with just two computer programs, but can interconnect a plurality of computer programs that are operating on any number of computers, including multiple programs operating simultaneously on the same computer. Moreover, it will be apparent to one of ordinary skill in the art that the data can also flow both ways across the interface 10. Thus, the invention is not limited to the uni-directional data flow described for the simulation model/visualization tool combination discussed above.

Although the invention has been described in detail with reference to a certain preferred embodiment, variations and modifications exist within the scope and spirit of the invention as described and defined in the following claims.

I claim:

1. An interface for facilitating communications among a plurality of computer programs connected by a communications program, the interface comprising:

a template file for each of the plurality of computer programs, each template file defining data for its respective computer program and allocating memory for the data, and a plurality of equality files, each equality file equating data of one of the plurality of computer programs with data of another of the plurality of computer programs, means for transmitting equated data from one of the plurality of computer programs to another of the plurality of computer programs.

2. The interface of claim 1 wherein the transmitting means includes a master interface that communicates with a first of the plurality of computer programs and a slave interface that communicates with a second of the plurality of computer programs.

3. The interface of claim 2 further including a plurality of blocks of memory, wherein the first of the plurality of computer programs shares a first block of memory with the master interface and the second of the plurality of computer programs shares a second block of memory with the slave interface.

4. The interface of claim 2 wherein the master interface includes means for converting the data structure and format of the data of the first of the plurality of computer programs to match the data structure and format of the data of the second of the plurality of computer programs.

5. The interface of claim 4 wherein the means for converting includes a lexical analyzer for analyzing the template files and a memory mapper for allocating memory for data to be passed between the first and the second computer programs based on the contents of the equality file equating the data of the first of the plurality of computer programs with the data of the second of the plurality of computer programs.

6. The interface of claim 1 wherein each template file includes means for defining input and output data for its respective computer program using the data structure and format of its respective computer program.

7. The interface of claim 6 wherein the equality file includes means for equating the output data of the first of the plurality of computer programs, as defined by its respective template file, to the input data of the second of the plurality of computer programs, as defined by its respective template file.

8. The interface of claim 7 further comprising shared memory wherein each template file allocates input and output data of its respective computer program to blocks of shared memory.

9. The interface of claim 8 further including means for taking the output data of the first of the plurality of computer programs from its allocated block of shared memory, converting the output data to the structure and format of the input data of the second of the plurality of computer programs, and transmitting the converted data to the block of shared memory allocated for the input data of the second of the plurality of computer programs.

10. The interface of claim 2 wherein the master interface includes a lexical analyzer and a memory mapper, the lexical analyzer having means for converting information received from the template files into a format and structure required by the memory mapper and the memory mapper including means for defining a master memory block allocation table and a slave memory block allocation table based on information contained in the template files.

11. An interface for facilitating communications between a plurality of computer programs connected by a communication program communicating with each of the plurality of computer programs, the interface comprising:

means for equating the data structure and format of output data of a first of the plurality of computer programs with the data structure and format of input data of a second of the plurality of computer programs, and means for accessing the output data of the first of the plurality of computer programs, converting the output data to the data structure and format of the second of the plurality of computer programs based on the content of the equating means, and providing the converted data as input data to the second of the plurality of computer programs.

12. The interface of claim 11 wherein the means for accessing, converting and providing includes a plurality of template files, with each of the plurality of template files defining the data of one of the plurality of computer programs and allocating that data to memory.

13. The interface of claim 12 wherein the plurality of template files includes a first template file for defining the input and output data of the first of the plurality of computer programs and allocating that data to a first block of shared memory using the data structure and format of the first of the plurality of computer programs and a second template file defining the input and output data of the second computer program and allocating that data to a second block of shared memory using the data structure and format of the second of the plurality of computer programs.

14. The interface of claim 13 wherein the means for accessing, converting and providing includes a master interface and a slave interface wherein the master interface shares the first block of shared memory with the first of the plurality of computer program and the slave interface shares the second block of shared memory with the second of the plurality of computer programs.

15. The interface of claim 11 wherein the means for accessing, converting and providing includes a plurality of template files, a master interface, and a slave interface.

16. The interface of claim 15 wherein the master interface includes a lexical analyzer and a memory mapper and the lexical analyzer analyzes information contained in the template file and puts the analyzed information into information tables.

17. The interface of claim 16 wherein the memory mapper analyzes the information in the information tables for data size and data type and maps the information to memory block allocation tables.

18. An interface for adapting the output of a first computer program to the input requirements of a second computer program, the interface comprising:

first template means for defining output data of the first computer program, second template means for defining input data of the second computer program, means for equating the definition of the data of the first computer program to the definition of the data of the second computer program, and means for transmitting equated data between the first and second computer programs.

19. The interface of claim 18 wherein the first template means includes first means for allocating a first memory block for the output data of the first computer program and the second template means includes second means for allocating a second memory block for the input data of the second program.

20. The interface of claim 19 wherein the transmitting means includes means for taking the output data from the first memory block and converting it for use as input data to the second computer program and transmitting the converted data to the second memory block.

21. The interface of claim 20 wherein the transmitting means includes means for converting the output data from the data structure and format of the first program to the data structure and format of the second program based on the content of the equating means.

22. The interface of claim 18 wherein the first template means includes a first template file configured to map the output data of the first computer program to a first memory block in the format and data structure of the first computer program and the second template means includes a second template file configured to map the input data of the second computer program to a second memory block in the format and data structure of the second computer program and the means for equating includes an equality file that equates the data of the first computer program, as defined by the first template file to the data of the second computer program, as defined by the second template file.

23. A run-time, reconfigurable interface for adapting the output data of a first computer program to the input requirements of a second computer program, the interface comprising:
- a first template file adapted to define output data of a first computer program and allocate the output data to a first memory block in the data structure and format of the first computer program;
- a second template file adapted to define input data of a second computer program and allocate the input data to a second memory block in the data structure and format of the second computer program;
- an equality file adapted to equate the output data and the input data, and
- a lexical analyzer using the template files and the equality file to configure a master interface and a slave interface to transmit data from the first memory block to the second block and converting the data from the data structure and format of the first computer program to the data structure and format of the second computer program during transmission to the second memory block.

24. A method of facilitating communications among computer programs, the method comprising the steps of:
- defining output data for a first computer program,
- defining input data for a second computer program,
- equating the output data of the first computer program with the input data of the second computer program,
- providing a master interface in communication with the first computer program and a slave interface in communication with the second computer program for transmitting data from the first computer program to the second computer program, and providing means for converting the output data from a form usable by the first computer program to a form usable by the second computer program and during transmission from the first computer program to the second computer program.

25. The method of claim 24 wherein the step of defining output data includes the step of creating a template file for each of the plurality of computer programs.

26. The method of claim 25 wherein each template file includes means for defining the output data and the input data for its respective computer program in the data structure and format of its respective computer program.

27. The method of claim 26 wherein the template file further includes means for defining a block of shared memory.

28. The method of claim 27 wherein each template file includes means for mapping the input and output data of its respective computer program, as defined in the template file, to the block of shared memory.

29. The method of claim 24 wherein the equating step includes the step of creating a plurality of equality files, wherein each equality file equates the definition of the output data of a first of the plurality of computer programs with the definition of the input data of a second of the plurality of computer programs.

30. An interface for facilitating communications among a plurality of computer programs, the interface comprising:
- a master interface in communication with a first of the plurality of computer programs, and
- a plurality of slave interfaces,
- wherein each of the plurality of slave interfaces is in communication with one of the remaining of the plurality of computer programs, and
- wherein the master interface takes data from the first of the plurality of computer programs, converts the data from the data structure and format of said first computer program to the data structure and format of each of the remaining of the plurality of computer programs, and transmits the converted data to the slave interfaces to be passed on to the remaining of the plurality of computer programs.

31. The interface of claim 30 further comprising a template file for each of the plurality of computer programs for defining the data of its respective computer program and a plurality of equality files, wherein each of the plurality of equality files equates the data structure and format of one of the plurality of computer programs to the data structure and format of another of the plurality of computer programs.

32. The interface of claim 31 wherein the master interface further comprises a lexical analyzer and a memory mapper, wherein the lexical analyzer analyzes the information from the template file of the first of the plurality of computer programs and the memory mapper allocates data to memory mapping tables.

33. The interface of claim 30 further comprising a plurality of blocks of shared memory wherein the first of the plurality of computer programs shares a first of the plurality of blocks of shared memory with the master interface and each of the remaining of the plurality of computer programs shares one of the remaining of the plurality of blocks of shared memory with the one of the plurality of slave interfaces with which it communicates.

* * * * *